United States Patent
Imashiro et al.

(10) Patent No.: US 6,333,101 B1
(45) Date of Patent: Dec. 25, 2001

(54) METHOD OF ADHERING ADHERENDS

(75) Inventors: Yasuo Imashiro; Kazuo Saito; Satoshi Amano; Takahiko Itoh; Hideshi Tomita; Ikuo Takahashi, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 08/141,359

(22) Filed: Oct. 28, 1993

Related U.S. Application Data

(63) Continuation-in-part of application No. 08/022,092, filed on Feb. 25, 1993, now abandoned.

(30) Foreign Application Priority Data

Feb. 28, 1992 (JP) .................................................. 4-078324

(51) Int. Cl.[7] ........................................................ B32B 3/00
(52) U.S. Cl. .................. 428/312.2; 156/330; 428/317.1; 428/414; 525/452; 525/528; 525/907
(58) Field of Search ..................... 525/452, 907, 525/528; 428/4.4, 312.2, 317.7; 156/330

(56) References Cited

U.S. PATENT DOCUMENTS

| | | | | |
|---|---|---|---|---|
| 3,679,534 | * | 7/1972 | Weinberg | 156/330 |
| 3,843,481 | * | 10/1974 | Honeisel | 156/330 |
| 4,088,665 | * | 5/1978 | Findeisen et al. | 525/440 |
| 5,079,326 | * | 1/1992 | Suzuki et al. | 521/901 |
| 5,126,423 | * | 6/1992 | Iwamoto | 525/528 |

* cited by examiner

Primary Examiner—John J. Gallagher
(74) Attorney, Agent, or Firm—Kubovcik & Kubovcik

(57) ABSTRACT

The present invention provides a method of adhering adherends, including (i) providing at least two adherends at least one of which is made of a flexible material, and (ii) joining the adherends together to form a structure using a heat-resistant adhesive composition containing mainly 1) a polycarbodiimide resin and an epoxy resin, or 2) a polycarbodiimide resin, an epoxy resin and a curing agent for the polycarbodiimide resin, or 3) a polycarbodiimide resin, an epoxy resin and a curing agent for the epoxy resin. The heat-resistant adhesive composition can be applied under mild conditions, and the resultant structure has excellent heat resistance and chemical resistance, and has superior adhesion strength particularly at high temperatures.

12 Claims, No Drawings

METHOD OF ADHERING ADHERENDS

This application is a continuation-in-part of application Ser. No. 08/022,092 filed Feb. 25, 1993 (now abandoned).

FIELD OF THE INVENTION

The present invention relates to a method of adhering adherends. More particularly, the present invention relates to a method of adhering adherends using; an adhesive composition superior in thermal stability of adhesive strength, which is suitably used in production of gasket materials, electromagnetic interference shield materials, electric appliances, civil engineering and construction materials, household appliances, etc., all employing flexible material such as expanded graphite at least as one adherend.

BACKGROUND OF THE INVENTION

Expanded graphite sheets have flexibility and are obtained by subjecting a graphite of highly developed crystal structure, such as natural graphite, kish graphite, pyrolytic graphite or the like to an acid treatment with a strongly oxidizing solution such as concentrated sulfuric acid-nitric acid mixture, concentrated sulfuric acid-potassium permanganate mixture or the like to form a graphite intercalation compound, subjecting the graphite intercalation compound to water washing and then to rapid heating to convert it into a graphite powder which is expanded in the C axis direction of graphite crystal, and subjecting the graphite powder to cold processing.

Above-mentioned expanded graphite sheets are superior in heat resistance, chemical resistance, sealing property, stress relaxation, etc. and are therefore in wide use as a gasket material or an electromagnetic interference shield material for automobile engine, atomic reactor, ship building or general industrial use.

As the performance requirements for the above applications have become higher, the performance requirements for the expanded graphite sheet used therein have become higher as well. Expanded graphite sheets are considered to have problems particularly in mechanical properties (bending and tensile strengths) as well as in leakage and significant strength reduction both caused by the infiltration of liquid thereinto.

In order to solve these problems, use of reinforcing material for expanded graphite sheet was proposed. As the reinforcing material, there are used a metal plate, a metal foil, a metal net, a high-strength fiber and a fabric made of said fiber; and gaskets, etc. are in actual production by attaching such a reinforcing material to an expanded graphite sheet with an adhesive. As this adhesive, there have been mainly used those of rubber type, epoxy resin type, acrylic resin type, phenolic resin type or polyamide type. As the performance requirements for expanded graphite sheet have become higher as mentioned above, however, it has come to be pointed out that the above conventional adhesives are not sufficient in heat resistance, adhesive strength, chemical resistance, etc.

Meanwhile, adhesives of polyimide type or polybenzimidazole type with excellent heat resistance have been developed in recent years. These adhesives, however, have problems in that they contain a particular high-boiling solvent, must satisfy severe (high temperature and high pressure) adhesion conditions owing to the physical properties, are expensive, and are used in limited applications.

In order to solve these problems, modification of epoxy resin was attempted. For example, Japanese Patent Application Kokai (Laid-Open) No. 260669/1985 proposes a heat-resistant epoxy resin type adhesive, for example, comprising polyfunctional epoxy resin as triglycidyl ether of triphenol, an aromatic diamine as curing agent and an inorganic filler. Also, Japanese Patent Application Kokai (Laid-Open) Nos. 89380/1984 and 79079/1985 propose epoxy resin type adhesive compositions each comprising an epoxy resin and a rubber component dispersed therein.

These conventional compositions, however, are solid and have a short pot life, and are inferior in workability and insufficient in heat resistance. Further, Japanese Patent Application Kokai (Laid-Open) No. 30122/1987 describes a composition obtained by adding a thermosetting bismaleimide compound to a polyimide resin to achieve improved thermal stability of adhesive strength. This composition, however, has a high curing temperature of 275° C. and is far from practical applicability in production of gasket, etc.

The present invention is intended to provide a heat-resistant adhesive composition which can be used in adhesion of flexible material such as expanded graphite, etc. under mild conditions and which is superior in heat resistance, chemical resistance, and adhesive strength particularly at high temperatures.

SUMMARY OF THE INVENTION

The present invention provides a method of adhering adherends, at least one of which is made of a flexible material, using a heat-resistant adhesive composition comprising mainly a polycarbodiimide resin and an epoxy resin, wherein the proportion of the epoxy resin is 1 part by weight or more per 100 parts by weight of the polycarbodiimide resin.

The present invention provides a method of adhering adherend, at least one of which is made of a flexible material, using a heat-resistant adhesive composition comprising mainly a polycarbodiimide resin, an epoxy resin and a curing agent for the polycarbodiimide resin, wherein the proportions of the epoxy resin and the curing agent for the polycarbodiimide resin are 1 part by weight or more and 0.1 part by weight of more, respectively, per 100 parts by weight of the polycarbodiimide resin.

The present invention further provides a method of adhering adherends, at least one of which is made of a flexible material, using a heat-resistant adhesive composition comprising mainly a polycarbodiimide resin, an epoxy resin and a curing agent for the epoxy resin, wherein the proportion of the epoxy resin is 1 part by weight or more per 100 parts by weight of the polycarbodiimide resin and the proportion of the curing agent for the epoxy resin is 0.1 part by weight of more per 100 parts by weight of the epoxy resin.

DETAILED DESCRIPTION OF THE INVENTION

The present invention is hereinafter described in detail.

The polycarbodiimide resin used in a heat-resistant adhesive composition of the present invention can be produced by, for example, a process disclosed in Japanese Patent Application Kokai (Laid-Open) No. 61599/1976, a process by L. M. Alberino et al. [J. Appl. Polym. Sci., 21, 1999 (1977)] or a process disclosed in Japanese Patent Application Kokai (Laid-Open) No. 292316/1990. That is, it can be produced by using an organic polyisocyanate as starting material and a catalyst which promotes the carbodiimidization of said isocyanate. As the organic polyisocyanate, there can be mentioned, for example, 2,4-tolylene diisocyanate, 2,6-tolylene diisocyanate, a mixture of 2,4-tolylene diisocyanate and 2,6-tolylene diisocyanate, crude tolylene diisocyanate, crude methylene diphenyl diisocyanate, 4,4', 4"-triphenylmethylene triisocyanate, xylene diisocyanate, hexamethylene-1,6-diisocyanate, lysine diisocyanate, hydrogenated methylene diphenyl diisocyanate, m-phenyl diisocyanate, naphthylene-1,5-diisocyanate, 4,4'-biphenylene diisocyanate, diphenylmethane-4,4'-diisocyanate, 3,3'-dimethoxy-4,4'-biphenyl diisocyanate, 3,3'-dimethyldiphenylmethane-4,4'-diisocyanate, isophorone diisocyanate and their mixtures.

The polycarbodiimide resin may be a polycarbodiimide having a controlled molecular weight, produced by, for example, using in the production, at least one monoisocyanate to terminate polycondensation at a certain stage. As such a monoisocyanate for blocking the terminals of the formed polycarbodiimide to control the molecular weight thereof, there can be mentioned, for example, phenyl isocyanate, o-, m-or p-tolyl isocyanate, dimethylphenyl isocyanate, cyclohexyl isocyanate and methyl isocyanate. As is easily inferred, the terminal-blocking agent may also be a derivative of an isocyanate-terminated compound easily obtained by reacting about 1 mole of a compound having a —OH, —NH$_2$, —COOH, —SH or —NH-alkyl terminal, with 2 moles of an aromatic diisocyanate.

The catalyst for promoting the carbodiimidization of isocyanate, used in the present invention can be exemplified by various compounds. However, 1-phenyl-2-phospholene-1-oxide, 3-methyl-2-phospholene-1-oxide, 1-ethyl-2-phospholene-1-oxide and 3-phospholene isomers thereof are preferable in view of the yield of polycarbodiimide and other reasons.

The production of polycarbodiimide is conducted in the absence of any solvent or in a solvent such as tetrahydrofuran, tetrachloroethylene or the like. In the present invention, the thus-produced polycarbodiimide resin of powder or varnish form can be used in one or more kinds.

As the epoxy resin used in a heat-resistant adhesive composition of the present invention, there can be mentioned epoxy resins having at least one epoxy group in the molecule, such as glycidyl ether type epoxy resin (e.g. bisphenol A type epoxy resin, novolac type epoxy resin, cresol novolac type epoxy resin), alicyclic epoxy resin, glycidyl ester type epoxy resin, heterocyclic epoxy resin, rubber-modified liquid epoxy resin and the like. These epoxy resins can be used singly or in combination of two or more. The epoxy resin used in the present invention is not restricted to these, and any of generally known epoxy resins can be used. A liquid epoxy resin is preferable.

As the curing agent for polycarbodiimide resin, used in the present invention, there can be mentioned, for example, active hydrogen compounds disclosed in, for example, Japanese Patent Application Kokai (Laid-Open) Nos. 87460/1985, 235414/1986 and 268714/1986, i.e. compounds having, in the molecule, at least one amino, phenolic hydroxyl, alcoholic hydroxyl, carboxyl or thiol group. These compounds can be used singly or in combination of two or more. Specific examples of the curing agent are urea, 4,4'-diaminodiphenyl ether, 4,4'-diaminodiphenylmethane, 4,4'-isopropylidenediphenol, amino-S-triazine, 1,3,5-trihydroxytriazine, hydroquinone, terephthalic acid, o- or m-phthalic acid, thiophenol, pyromellitimide, trimellitic acid, pyromellitic acid and phenol novolac.

As the curing agent for polycarbodiimide resin, there can also be used diazabicycloundecene, p-dimethylaminophenol, tris(dialkylaminoalkyl)hexahydro-S-triazine, sodium acetate, potassium acetate, tertiary amine, etc. all capable of catalyzing the self-cross linking reaction of carbodiimide group.

As the curing agent for epoxy resin, there can be mentioned generally known curing agents for epoxy resins, such as polyamine, acid anhydride, polyphenol, polymercaptan and the like. They can be used singly or in combination of two or more. Specific examples of said curing agent are diethylenetriamine, triethylenetetramine, tetraethylenepentamine, toluenediamine, isophoronediamine, N-aminoethylpiperazine, 3,9-bis(3-aminopropyl)-2,4,8,10-tetraoxyspiro-(5,5')undecane adduct, diaminodiphenylsulfone, m-phenylenediamine, phthalic anhydride, tetrahydrophthalic anhyrie, methylnadic anhydride, pyromellitic anhydride, phenol novolac, polymercaptan, 2,4,6-tris(dimethylaminomethyl)phenol, 2-ethyl-4-methylimidazole, BF$_3$-monoethylamine complex and amino resin. Some curing agents can cure both the polycarbodiimide resin and the epoxy resin, but such curing agents can be used in the present invention.

The heat-resistant adhesive composition composed of the above-mentioned components can be produced by the following processes.

When the Polycarbodiimide Resin Takes a Varnish Form

First, a polycarbodiimide resin or a mixed polycarbodiimide resin is produced. Then, it is mixed with one or more epoxy resins. The amount of the epoxy resin used is 1 part by weight or more per 100 parts by weight of the polycarbodiimide resin. It is possible to use the epoxy resin in an amount of 200 parts by weight or so, but use of too large an amount of the epoxy resin may adversely affect the heat resistance, etc. of the polycarbodiimide resin.

It is possible to add one or more epoxy resins at the time of polycarbodiimide resin production and produce the heat-resistant adhesive composition of the present invention under the production conditions of polycarbodiimide resin. In this case, the preferable reaction temperature must be about 150° C. or below and, when a reaction temperature of higher than 150° C. or so is employed, the reaction between isocyanate group and epoxy group takes place to produce oxazolidone, which is not preferable in view of the heat resistance and adhesive strength of the adhesive composition obtained.

When the epoxy resin is added and mixed with the polycarbodiimide resin after the production of the polycarbodiimide resin, it is possible to add a curing agent for polycarbodiimide resin or epoxy resin after the addition of the epoxy resin. The timing of addition of the curing agent for polycarbodiimide resin or epoxy resin may be right after the addition of the epoxy resin but is preferably right before the use of the adhesive composition obtained. The amount of the curing agent for polycarbodiimide resin is about 0.1–50 parts by weight per 100 parts by weight of said resin, and the amount of the curing agent for epoxy resin is about 0.1–100 parts by weight per 100 parts by weight of said resin.

When the Polycarbodiimide Resin is a Powder

A polycarbodiimide resin or a mixed polycarbodiimide resin is produced. Then, it is mixed with one or more epoxy resins. The amount of the epoxy resin used is the same as when the polycarbodiimide resin of varnish form is used. The form of the epoxy resin may be a liquid or a powder, but a liquid is preferred. It is because by using a liquid epoxy resin, the resulting adhesive composition of the present invention becomes a solvent-free paste type, is easy to handle, and causes no environmental pollution. Use of an epoxy resin of powder form is possible and, in this case, an adhesive composition of powder form according to the present invention is obtained. Such an adhesive composition can be used as it is or by adding a solvent before use.

Also when the polycarbodiimide resin is a powder, it is possible to add a curing agent for polycarbodiimide resin or epoxy resin after the addition of the epoxy resin, in the same amount as mentioned above. The timing of addition of the curing agent for polycarbodiimide resin or epoxy resin may be right after the addition of the epoxy resin but is preferably right before the use of the adhesive composition obtained.

A method of adhering adherends of the present invention by the heat-resistant adhesive composition is conducted as follows.

When the Adhesive Composition Takes a Varnish Form

The adhesive composition of varnish form is coated on at least one side of an adherend by an ordinary method using a brush, a sprayer, a roll coater or the like so that the amount coated becomes, for example, 30 g/m$^2$. Next, the solvent contained in the composition is removed. Then, another adherend is superimposed on the composition coated on the first adherend. They are pressurized at a temperature of 100° C. or more for several seconds to give rise to adhesion. The resulting laminate may be annealed at 100–250° C.

At least one of the adherends must be a flexible material. The flexible material can be exemplified by an expanded graphite sheet; a film, an unwoven fabric, a woven fabric, a paper-like material, a reticulate material or a porous material each made of a polymer such as polyimide, polyamide, polyester, rayon, cellulose, fluororesin, polyacrylonitrile or the like; and an unwoven fabric, a woven fabric or a paper-like material each made of an inorganic substance such as rock wool, glass fiber, ceramic fiber, carbon fiber or the like. The other adherend may be a flexible material or an inflexible material. The flexible material can be any of the flexible materials mentioned above, and the inflexible material can be exemplified by a plate, a sheet, a foil, a woven material or a metal net each made of a metallic substance such as stainless steel, aluminum, iron, copper or the like. Incidentally, the flexible material is preferably an expanded graphite sheet.

When the Adhesive Composition is a Solvent-free Type

The adhesive composition of solvent-free type is coated on at least one side of an adherend in the same manner as mentioned above (when the composition is a paste type) or is applied by, for example, utilizing the clearance of rolls (when the composition is a powder); another adherend is superimposed on the composition coated or applied; they are pressurized at a temperature of 100° C. or more for several seconds to several minutes to give rise to adhesion. The resulting laminate may be annealed at 100–250° C.

As the adherend, there can be mentioned, for example, those mentioned above. Also in this case, the flexible material is preferably an expanded graphite sheet.

The thus obtained laminate structure is a laminate obtained by adhering at least two adherends according to the present method, and has excellent thermal stability of adhesion strength. By appropriately selecting the kinds of adherends used, various other advantages can be obtained; for example, an expanded graphite sheet can be reinforced or subjected to surface modification for improvement in fragility or sealability or for reduced thermal conductivity.

The present invention is hereinafter described in more detail referring to Examples and Comparative Examples.

EXAMPLE 1

Synthesis of Polycarbodiimide of Varnish Form

Into a 3,000-ml four-necked flask equipped with a heater, a thermometer, a stirrer and a condenser were fed 80-TDI (a 8:2 mixture of 2, 4-tolylene diisocyanate and 2, 6-tolylene diisocyanate) as raw material isocyanate, tetrahydrofuran as solvent, and 3-methyl-1-phenyl-2-phospholene-1-oxide as catalyst in the following amounts.

| 80-TDI | 150 g |
|---|---|
| Tetrahydrofuran | 2400 ml |
| Catalyst | 0.3 g |

The mixture was subjected to a reaction for 70 hours under refluxing to obtain a polycarbodiimide of varnish form.

Preparation of Adhesive Composition

The above polycarbodiimide of varnish form was mixed with an epoxy resin (Epicoat 828, a product of Yuka Shell Epoxy K.K.) in the following amounts to prepare an intended adhesive composition.

| Polycarbodiimide of varnish form | 2000 ml |
|---|---|
| Epicoat 828 | 90 g |

Preparation of Sheet-like Laminate and its Adhesive Strength

The above adhesive composition was coated on a stainless steel plate of 50 μm in thickness in an amount of 10 g/m$^2$. The coated adhesive composition was dried at 70° C. for 10 hours. On the dried adhesive composition on the stainless steel plate was superimposed expanded graphite of 0.8 mm in thickness. They were subjected to heating and pressurization at 200° C. at 10 kgf/cm$^2$ for 10 minutes to obtain a sheet-like laminate.

The sheet-like laminate was measured for adhesive strength and thermal stability of adhesive strength as follows.

[Adhesive Strength]

The sheet-like laminate right after lamination was measured for adhesive strength by a cross-cut tape test according to JIS K 5400.

[Thermal Stability of Adhesive Strength]

The sheet-like laminate was heated at 250° C. for 70 hours, at 300° C. for 24 hours, and then subjected to a cross-cut tape test according to JIS K 5400.

EXAMPLE 2

Synthesis of Polycarbodiimide of Varnish Form

Raw materials were fed into the same flask as used in Example 1, in the following amounts. The solvent was changed to tetrachloroethylene, as compared with Example 1.

| 80-TDI | 275 g |
|---|---|
| Tetrachloroethylene | 2400 ml |
| Catalyst | 0.55 g |

They were subjected to a reaction for 5 hours under refluxing to obtain a polycarbodiimide of varnish form.

Preparation of Adhesive Composition

The above polycarbodiimide of varnish form was mixed with an epoxy resin in the following amounts to prepare an intended adhesive composition.

| | |
|---|---|
| Polycarbodiimide of varnish form | 2000 ml |
| Epicoat 828 | 160 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 3

Synthesis of Polycarbodiimide of Varnish Form

Raw materials were fed into the same flask as used in Example 1, in the following amounts. The solvent was changed to tetrahydrofuran and tetrachloroethylene, as compared with Example 1.

| | |
|---|---|
| 80-TDI | 212 g |
| Tetrahydrofuran | 1200 ml |
| Tetrachloroethylene | 1200 ml |
| Catalyst | 0.42 g |

They were subjected to a reaction for 10 hours under refluxing to obtain a polycarbodiimide of varnish form.

Preparation of Adhesive Composition

The above polycarbodiimide of varnish form was mixed with an epoxy resin in the following amounts to prepare an intended adhesive composition.

| | |
|---|---|
| Polycarbodiimide of varnish form | 2000 ml |
| Epicoat 828 | 130 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 4

Synthesis of Polycarbodiimide of Varnish Form

Raw materials were fed into the same flask as used in Example 1, in the following amounts. The isocyanate was changed to p-MDI (4,4'-diphenylmethane diisocyanate), as compared with Example 1.

| | |
|---|---|
| p-MDI | 136 g |
| Tetrahydrofuran | 2400 ml |
| Catalyst | 0.27 g |

They were subjected to a reaction for 17 hours under refluxing to obtain a polycarbodiimide of varnish form.

Preparation of Adhesive Composition

The above polycarbodiimide of varnish form was mixed with the same epoxy resin as used in Example 1 in the same amounts as in Example 1 to prepare an intended adhesive composition.

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 5

Synthesis of Polycarbodiimide of Varnish Form

Raw materials were fed into the same flask as used in Example 1, in the following amounts. The isocyanate was changed to EDI (diphenyl ether-4,4'-diisocyanate), as compared with Example 1.

| | |
|---|---|
| EDI | 136 g |
| Tetrahydrofuran | 2400 ml |
| Catalyst | 0.27 g |

They were subjected to a reaction for 10 hours under refluxing to obtain a polycarbodiimide of varnish form.

Preparation of Adhesive Composition

The above polycarbodiimide of varnish form was mixed with the same epoxy resin as used in Example 1 in the same amounts as in Example 1 to prepare an intended adhesive composition.

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 6

Synthesis of Polycarbodiimide of Varnish Form

Raw materials were fed into the same flask as used in Example 1, in the following amounts. The isocyanate was changed to TODI (tolidine diisocyanate), as compared with Example 1.

| | |
|---|---|
| TODI | 136 g |
| Tetrahydrofuran | 2400 ml |
| Catalyst | 0.27 g |

They were subjected to a reaction for 200 hours under refluxing to obtain a polycarbodiimide of varnish form.

Preparation of Adhesive Composition

The above polycarbodiimide of varnish form was mixed with the same epoxy resin as used in Example 1 in the same amounts as in Example 1 to prepare an intended adhesive composition.

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 7

Synthesis of Polycarbodiimide of Varnish Form

Raw materials were fed into the same flask as used in Example 1, in the following amounts. The isocyanate was changed to 80-TDI and p-MDI, as compared with Example 1.

| | |
|---|---|
| 80-TDI | 57 g |
| p-MDI | 83 g |
| Tetrahydrofuran | 2400 ml |
| Catalyst | 0.28 g |

They were subjected to a reaction for 20 hours under refluxing to obtain a polycarbodiimide of varnish form.

Preparation of Adhesive Composition

The above polycarbodiimide of varnish form was mixed with the same epoxy resin as used in Example 1 in the same amounts as in Example 1 to prepare an intended adhesive composition.

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 8

Preparation of Polycarbodiimide of Varnish Form and Adhesive Composition

Raw materials including an epoxy resin (Epicoat 828) were fed into the same flask as used in Example 1, in the following amounts.

| | |
|---|---|
| 80-TDI | 112 g |
| Epicoat 828 | 150 g |
| Tetrahydrofuran | 2400 ml |
| Catalyst | 0.3 g |

They were subjected to a reaction for 17 hours under refluxing to obtain a polycarbodiimide of varnish form.

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 9

Preparation of Adhesive Composition

The polycarbodiimide of varnish form synthesized in Example 1 was mixed with an epoxy resin (Epicoat 828) in the following amounts to prepare an intended adhesive composition.

| | |
|---|---|
| Polycarbodiimide of varnish form | 2000 ml |
| Epicoat 828 | 10 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 10

Preparation of Adhesive Composition

The polycarbodiimide of varnish form synthesized in Example 1 was mixed with an epoxy resin (Epicoat 828) in the following amounts to prepare an intended adhesive composition.

| | |
|---|---|
| Polycarbodiimide of varnish form | 2000 ml |
| Epicoat 828 | 180 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 11

Preparation of Adhesive Composition

The polycarbodiimide of varnish form synthesized in Example 1 was mixed with an epoxy resin (EPICLON N-730, a product of DAINIPPON INK & CHEMICALS, INC.) in the following amounts to prepare an intended adhesive composition.

| | |
|---|---|
| Polycarbodiimide of varnish form | 2000 ml |
| EPICLON N-730 | 90 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 12

Preparation of Adhesive Composition

The polycarbodiimide of varnish form synthesized in Example 1 was mixed with an epoxy resin (EPICLON N-665XP, a product of DAINIPPON INK & CHEMICALS, INC.) in the following amounts to prepare an intended adhesive composition

| | |
|---|---|
| Polycarbodiimide of varnish form | 2000 ml |
| EPICLON N-665XP | 90 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 13

Preparation of Adhesive Composition

An epoxy resin (Epicoat 828) was mixed with a curing agent for polycarbodiimide, i.e. SA-501 (a product of SAN-APRO LIMITED) which was a catalyst for carbodiimide trimerization. The resulting mixture was mixed with the polycarbodiimide of varnish form synthesized in Example 1, to prepare an intended adhesive composition. The compounding recipe of the composition was as follows.

| | |
|---|---|
| Polycarbodiimide of varnish form | 2000 ml |
| Epicoat 828 | 90 g |
| SA-501 | 0.9 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 14

Preparation of Adhesive Composition

The polycarbodiimide of varnish form synthesized in Example 1 was mixed with an epoxy resin (Epicoat 828) and a curing agent for epoxy resin, i.e. DDS (diaminodiphenylsulfone) in the following amounts to prepare an intended adhesive composition.

| | |
|---|---|
| Polycarbodiimide of varnish form | 2000 ml |
| Epicoat 828 | 90 g |
| DDS | 30 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 15

Preparation of Adhesive Composition

The polycarbodiimide of varnish form synthesized in Example 1 was mixed with an epoxy resin (Epicoat 828) and a curing agent for epoxy resin, i.e. HY830 [a product of Ciba-Geigy (Japan) Limited] in the following amounts to prepare an intended adhesive composition.

| | |
|---|---|
| Polycarbodiimide of varnish form | 2000 ml |
| Epicoat 828 | 90 g |
| HY830 | 50 g |

Preparation of Sheet-like Laminate and its Adhesive Strength

A sheet-like laminate was prepared in the same manner as in Example 1, using the above adhesive composition. The laminate was measured for adhesive strength and thermal stability of adhesive strength in the same manner as in Example 1.

EXAMPLE 16

Synthesis of Polycarbodiimide of Powder Form

Into a 3,000-ml four-necked flask equipped with a heater, a thermometer, a stirrer and a condenser were fed p-MDI and phenyl isocyanate each as raw material isocyanate, tetrachloroethylene as solvent, and 3-methyl-1-phenyl-2-phospholene-1-oxide as catalyst in the following amounts.

| | |
|---|---|
| p-MDI | 100 g |
| Phenyl isocyanate | 9.52 g |
| Tetrachloroethylene | 350 ml |
| Catalyst | 0.2 g |

The mixture was subjected to a reaction for 6 hours under refluxing and cooled to room temperature. The reaction mixture containing a precipitate was filtered to collect a precipitate. The precipitate was dried and ground using a ball mill to obtain an intended polycarbodiimide of powder form.

Preparation of Adhesive Composition

The above polycarbodiimide of powder form was mixed with an epoxy resin (Epicoat 828) in the following amounts to prepare an intended adhesive composition.

| Polycarbodiimide of powder form | 100 g |
|---|---|
| Epicoat 828 | 11.1 g |

Preparation of Sheet-like Laminate and its Adhesive Strength

The above adhesive composition was coated on a polyimide film of 100 μm in thickness in an amount of 8 g/m². On the adhesive composition was superimposed expanded graphite of 200 μm in thickness. They were subjected to heating and pressurization under the conditions of 200° C., 10 minutes and 10 kgf/cm² to obtain a sheet-like laminate. The sheet-like laminate was measured for adhesive strength and thermal stability of adhesive strength in the same manner as in Example 1.

EXAMPLE 17

Preparation of Adhesive Composition

The polycarbodiimide of powder form synthesized in Example 16 was mixed with an epoxy resin (EPICLON N-730) in the following amounts to prepare an adhesive composition of paste form.

| Polycarbodiimide of powder form | 100 g |
|---|---|
| EPICLON N-730 | 45 g |

Preparation of Sheet-like Laminate and its Adhesive Strength

The above adhesive composition was coated on a polyimide film of 100 μm in thickness in an amount of 13 g/m². On the adhesive composition was superimposed a stainless steel plate of 100 μm in thickness. They were subjected to heating and pressurization under the conditions of 200° C., 10 minutes and 10 kgf/cm² to obtain a sheet-like laminate. The sheet-like laminate was measured for adhesive strength and thermal stability of adhesive strength in the same manner as in Example 1.

EXAMPLE 18

Preparation of Adhesive Composition

The polycarbodiimide of powder form synthesized in Example 16 was mixed with an epoxy resin (Epicoat 828) and a curing agent for epoxy resin [DDS (diaminodiphenyl sulfone)] in the following amounts to prepare an intended adhesive composition.

| Polycarbodiimide of powder form | 100 g |
|---|---|
| Epicoat 828 | 100 g |
| DDS | 33 g |

Preparation of Sheet-like Laminate and its Adhesive Strength

The above adhesive composition was coated on a copper plate of 100 μm in thickness in an amount of 10 g/m². On the adhesive composition was superimposed an expanded graphite sheet of 0.8 mm in thickness. They were subjected to heating and pressurization under the conditions of 200° C., 10 minutes and 50 kgf/cm² to obtain a sheet-like laminate. The sheet-like laminate was measured for adhesive strength and thermal stability of adhesive strength in the same manner as in Example 1.

EXAMPLE 19

The adhesive composition prepared in Example 1 was coated on one side of an expanded graphite sheet of 1.6 mm in thickness, in an amount of 10 g/m2, followed by drying at 70° C. for 10 hours. On the adhesive composition-coated side of the resulting sheet was superimposed an expanded graphite sheet of 1.6 mm in thickness. They were subjected to heating and pressurization under the conditions of 200° C., 10 minutes and 10 kgf/cm² to obtain a sheet-like laminate. The sheet-like laminate was measured for adhesive strength and thermal stability of adhesive strength in the same manner as in Example 1.

EXAMPLE 20

The adhesive composition prepared in Example 1 was coated on the both sides of an expanded graphite sheet of 0.8 mm in thickness in an amount of 10 g/m², followed by drying at 70° C. for 10 hours. The resulting sheet was sandwiched between two glass cloths each of plain weave having a thickness of 0.1 mm and a weight of 102 g/m². They were subjected to heating and pressurization under the conditions of 200° C., 10 minutes and 50 kgf/cm² to obtain a sheet-like laminate. The sheet-like laminate was measured for adhesive strength and thermal stability of adhesive strength in the same manner as in Example 1.

EXAMPLE 21

The adhesive composition prepared in Example 1 was coated on one side of an expanded graphite sheet of 0.4 mm in thickness, in an amount of 40 g/m², followed by drying at 70° C. for 7 hours. Between two of the thus obtained sheets was sandwiched an aluminum plate of 3 mm in thickness so that the adhesive composition-coated side of each sheet contacted with the aluminum plate. They were subjected to heating and pressurization under the conditions 180° C., 20 minutes and 10 kgf/cm² to obtain a plate-like laminate. The plate-like laminate was measured for adhesive strength and thermal stability of adhesive strength in the same manner as in Example 1.

EXAMPLE 22

The adhesive composition prepared in Example 1 was sprayed on both sides of a rock wool sheet (thickness=3 mm, weight=1200 g/m2, density 0.4, a paper-like material) in an amount of 20 g/m², followed by drying at 70° C. for 3 hours.

The resulting sheet was sandwiched between two cold-rolled steel plates each of 0.1 mm in thickness. They were subjected to heating and pressurization under the conditions of 220° C., 10 minutes and 30 kgf/cm² to obtain a plate-like laminate. The plate-like laminate was measured for adhesive strength and thermal stability of adhesive strength in the same manner as in Example 1.

COMPARATIVE EXAMPLE 1

An adhesive composition with the following compounding recipe was prepared.

| | |
|---|---|
| Epicoat 828 | 150 g |
| HY830 | 90 g |
| Tetrahydrofuran | 2000 ml |

Using this adhesive composition, a sheet-like laminate was prepared in the same manner as in Example 1. The sheet-like laminate was measured for adhesive strength and thermal stability of adhesive strength in the same manner as in Example 1.

COMPARATIVE EXAMPLE 2

Using the polycarbodiimide of varnish form synthesized in Example 1, a sheet-like laminate was prepared in the same manner as in Example 1. The sheet-like laminate was measured for adhesive strength and thermal stability of adhesive strength in the same manner as in Example 1.

COMPARATIVE EXAMPLE 3

The adhesive composition prepared in Example 1 was coated on one side of a stainless steel plate of 1 mm in thickness, in an amount of 30 g/m², followed by drying at 70° C. for 5 hours. On the adhesive composition-coated side of the resulting sheet was superimposed a stainless steel plate of 1 mm in thickness. They were subjected to heating and pressurization under the conditions of 200° C., 10 minutes and 10 kgf/cm² to obtain a plate-like laminate. The plate-like laminate was measured for adhesive strength and thermal stability of adhesive strength in the same manner as in Example 1.

The measurement results of Examples 1–18 and Comparative Examples 1–2 are shown in Table 1. As is clear from Table 1, the adhesive compositions of the present invention are superior in any of normal-temperature adhesive strength and thermal stability of adhesive strength while the adhesives of Comparative Examples are inferior in thermal stability of adhesive strength.

TABLE 1

| | Adhesive Strength | Thermal stability of adhesive strength | |
|---|---|---|---|
| | | 250° C. | 300° C. |
| Example 1 | 10 | 10 | 10 |
| Example 2 | 10 | 10 | 10 |
| Example 3 | 10 | 10 | 10 |
| Example 4 | 10 | 10 | 10 |
| Example 5 | 10 | 10 | 10 |
| Example 6 | 10 | 10 | 9 |
| Example 7 | 10 | 10 | 10 |
| Example 8 | 10 | 10 | 10 |
| Example 9 | 10 | 10 | 10 |

TABLE 1-continued

| | Adhesive Strength | Thermal stability of adhesive strength | |
|---|---|---|---|
| | | 250° C. | 300° C. |
| Example 10 | 10 | 10 | 10 |
| Example 11 | 10 | 10 | 10 |
| Example 12 | 10 | 10 | 10 |
| Example 13 | 10 | 10 | 9 |
| Example 14 | 10 | 10 | 9 |
| Example 15 | 10 | 10 | 9 |
| Example 16 | 10 | 10 | 8 |
| Example 17 | 10 | 10 | 8 |
| Example 18 | 10 | 10 | 8 |
| Example 19 | 10 | 10 | 10 |
| Example 20 | 10 | 10 | 10 |
| Example 21 | 10 | 10 | 10 |
| Comparative Example 1 | 10 | 0 | 0 |
| Comparative Example 2 | 10 | 6 | 0 |
| Comparative Example 3 | 10 | 3 | 0 |

What is claimed is:

1. A method of adhering adherends, comprising (i) providing at least two adherends, at least one of which is made of a flexible material, (ii) joining said adherends together to form a structure using a heat-resistant adhesive composition comprising mainly a polycarbodiimide resin and an epoxy resin, wherein the proportion of the epoxy resin is 1 part by weight or more per 100 parts by weight of the polycarbodiimide resin, such that said structure exhibits an adhesive strength of about 10 and a thermal stability of its adhesive strength of at least 8 at 300° C. as measured according to JIS K 5400.

2. A method of adhering adherends, comprising (i) providing at least two adherends, at least one of which is made of a flexible material, (ii) joining said adherends together to form a structure using a heat-resistant adhesive composition comprising mainly a polycarbodiimide resin, an epoxy resin and a curing agent for the polycarbodiimide resin, wherein the proportions of the epoxy resin and the curing agent for the polycarbodiimide resin are 1 part by weight or more and 0.1 part by weight or more, respectively, per 100 parts by weight of the polycarbodiimide resin, such that said structure exhibits an adhesive strength of about 10 and a thermal stability of its adhesive strength of at least 8 at 300° C. as measured according to JIS K 5400.

3. A method of adhering adherends according to claim 2, wherein the curing agent for the polycarbodiimide resin is capable of curing the epoxy resin.

4. A method of adhering adherends, comprising (i) providing at least two adherends, at least one of which is made of a flexible material, (ii) joining said adherends together to form a structure using a heat-resistant adhesive composition comprising mainly a polycarbodiimide resin, an epoxy resin and a curing agent for the epoxy resin, wherein the proportion of the epoxy rein is 1 part by weight or more per 100 parts by weight of the polycarbodiimide resin and the proportion of the curing agent for the epoxy resin is 0.1 part by weight or more per 100 parts by weight of the epoxy resin, such that said structure exhibits an adhesive strength of about 10 and a thermal stability of its adhesive strength of at least 8 at 300° C. as measured according to JIS K 5400.

5. A method of adhering adherends according to claim 4, wherein the curing agent for the epoxy resin is capable of curing the polycarbodiimide resin.

6. A method of adhering adherends according to any one of claims 1, 2 or 4, wherein at least one of the adherends is an expanded graphite sheet.

7. A structure comprising at least two adherends joined together through an adherent, wherein at least one of said adherends is made of a flexible material, wherein the adherent is a heat-resistant adhesive composition comprising mainly a polycarbodiimide resin and an epoxy resin, wherein the proportion of the epoxy resin is 1 part by weight or more per 100 parts by weight of the polycarbodiimide resin, such that said structure exhibits an adhesive strength of about 10 and a thermal stability of its adhesive strength of at least 8 at 300° C. as measured according to JIS K 5400.

8. A structure comprising at least two adherends joined together through an adherent, wherein at least one of said adherends is made of a flexible material, wherein the adherent is a heat-resistant adhesive composition comprising mainly a polycarbodiimide resin, an epoxy resin and a curing agent for the polycarbodiimide resin, wherein the proportions of the epoxy resin and the curing agent for the polycarbodiimide resin are 1 part by weight or more and 0.1 part by weight or more, respectively, per 100 parts by weight of the polycarbodiimide resin, such that said structure exhibits an adhesive strength of about 10 and a thermal stability of its adhesive strength of at least 8 at 300° C. as measured according to JIS K 5400.

9. A structure of adhered adherends according to claim 8, wherein the curing agent for the polycarbodiimide resin is capable of curing the epoxy resin.

10. A structure comprising at least two adherends joined together through an adherent, wherein at least one of said adherends is made of a flexible material, wherein the adherent is a heat-resistant adhesive composition comprising mainly a polycarbodiimide resin, an epoxy resin and a curing agent for the epoxy resin, wherein the proportion of the epoxy resin is 1 part by weight or more per 100 parts by weight of the polycarbodiimide resin and the proportion of the curing agent for the epoxy resin is 0.1 part by weight or more per 100 parts by weight of the epoxy resin, such that said structure exhibits an adhesive strength of about 10 and a thermal stability of its adhesive strength of at least 8 at 300° C. as measured according to JIS K 5400.

11. A structure of adhered adherends according to claim 10, wherein the curing agent for the epoxy resin is capable of curing the polycarbodiimide resin.

12. A structure of adhered adherends according to any of claims 7, 8 or 10, wherein at least one of the adherend is an expanded graphite sheet.

* * * * *